US011377971B2

(12) United States Patent
Igarashi et al.

(10) Patent No.: US 11,377,971 B2
(45) Date of Patent: Jul. 5, 2022

(54) GAS TURBINE COMBUSTOR

(71) Applicant: Mitsubishi Heavy Industries, Ltd., Chiyoda-ku (JP)

(72) Inventors: Shota Igarashi, Yokohama (JP); Tomomi Koganezawa, Yokohama (JP); Keisuke Miura, Chiyoda-ku (JP); Yoshitaka Hirata, Yokohama (JP); Shohei Yoshida, Yokohama (JP); Yoshitaka Terada, Yokohama (JP); Takehiko Nishikawa, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 16/670,617

(22) Filed: Oct. 31, 2019

(65) Prior Publication Data
US 2020/0141586 A1 May 7, 2020

(30) Foreign Application Priority Data

Nov. 1, 2018 (JP) ............................. JP2018-206419

(51) Int. Cl.
*F01D 9/02* (2006.01)
*F02C 7/28* (2006.01)
(Continued)

(52) U.S. Cl.
CPC ................ *F01D 9/023* (2013.01); *F02C 7/28* (2013.01); *F01D 11/005* (2013.01);
(Continued)

(58) Field of Classification Search
CPC ...................................................... F01D 9/023
See application file for complete search history.

(56) References Cited

U.S. PATENT DOCUMENTS 6,895,757 B2   5/2005  Mitchell et al.
8,141,879 B2   3/2012  Venkataraman et al.
(Continued)

FOREIGN PATENT DOCUMENTS

CN          2254483 Y     5/1997
CN         101354142 A    1/2009
(Continued)

OTHER PUBLICATIONS

Chinese-language Office Action issued in Chinese Application No. 201911059905.5 dated Jan. 13, 2021 (five (5) pages).
(Continued)

Primary Examiner — Katheryn A Malatek
Assistant Examiner — Alyson Joan Harrington
(74) Attorney, Agent, or Firm — Crowell & Moring LLP

(57) ABSTRACT

A gas turbine combustor includes multiple aft frames each having a floating seal that seals a gap between an aft frame and a gas turbine in inner and outer peripheries of the aft frame, and a side seal that seals a gap between the aft frames adjacent to each other in a circumferential direction, and a corner seal that is placed in a gap portion provided between corner portions of the aft frames adjacent to each other in the circumferential direction, seals air leaking from at least the gap portion into the gas turbine side, and is independent of the floating seal and the side seal.

13 Claims, 12 Drawing Sheets

(51) Int. Cl.
*F23R 3/60* (2006.01)
*F01D 11/00* (2006.01)

(52) U.S. Cl.
CPC ...... *F05D 2240/35* (2013.01); *F05D 2240/55* (2013.01); *F23R 3/60* (2013.01); *F23R 2900/00012* (2013.01)

(56) References Cited

U.S. PATENT DOCUMENTS

| | | | |
|---|---|---|---|
| 2009/0224082 A1 | 9/2009 | MacMillan et al. | |
| 2009/0317286 A1* | 12/2009 | Nishi | F01D 9/023 420/440 |
| 2010/0054928 A1* | 3/2010 | Schiavo | F01D 25/243 415/182.1 |
| 2010/0061837 A1* | 3/2010 | Zborovsky | F01D 9/023 415/58.4 |
| 2010/0201080 A1 | 8/2010 | Kunitake et al. | |
| 2012/0047897 A1 | 3/2012 | Hirata et al. | |
| 2012/0119449 A1* | 5/2012 | Demiroglu | F01D 9/023 277/652 |
| 2014/0083102 A1 | 3/2014 | Miura et al. | |
| 2015/0101345 A1* | 4/2015 | Green | F01D 9/02 60/799 |
| 2015/0135717 A1 | 5/2015 | Wada et al. | |
| 2017/0342850 A1* | 11/2017 | Morgan | F16J 15/025 |
| 2018/0058331 A1* | 3/2018 | Barton | F01D 9/023 |
| 2019/0063240 A1 | 2/2019 | Okazaki et al. | |

FOREIGN PATENT DOCUMENTS

| | | |
|---|---|---|
| CN | 102384474 A | 3/2012 |
| CN | 103672965 A | 3/2014 |
| CN | 104654361 A | 5/2015 |
| JP | 2003-193866 A | 7/2003 |
| WO | WO 2007/023734 A1 | 3/2007 |
| WO | WO 2010/027384 A1 | 3/2010 |
| WO | WO 2015/158506 A1 | 10/2015 |

OTHER PUBLICATIONS

German-language Office Action issued in German Application No. 10 2019 216 880.9 dated Feb. 18, 2021 with English translation (13 pages).

* cited by examiner

GAS TURBINE COMBUSTOR

CLAIM OF PRIORITY

The present application claims priority from Japanese Patent application serial no. 2018-206419, filed on Nov. 1, 2018, the content of which is hereby incorporated by reference into this application.

TECHNICAL FIELD

The present invention relates to a gas turbine combustor and a transition duct assembly, and more particular, a gas turbine combustor and a transition duct assembly suitable for a configuration in which a floating seal that seals a gap between an aft frame and a gas turbine and a side seal that seals a gap between the aft frames adjacent to each other in a circumferential direction are placed on an outer periphery of a connection portion of the gas turbine and the aft frame placed at an outlet of a transition duct of the combustor.

BACKGROUND OF THE INVENTION

One type of the gas turbines is a so-called multi can type gas turbine having multiple gas turbine combustors (hereinafter referred to as combustors) each having a combustion chamber in which combustion gas is generated, individually. In the multi can type gas turbine, the multiple combustors are normally disposed in an annular shape outside a rotating shaft of the gas turbine.

Each combustor includes a cylindrical type combustion liner having the combustion chamber therein, and a transition duct that guides combustion gas of high temperature and high pressure into a gas turbine nozzle. The transition duct is configured to connect the combustion chamber having a circular cross section in the combustion liner with a gas turbine nozzle having an annular flow path section.

For that reason, the transition duct has a circular upstream section depending on the cylindrical combustion liner and a downstream section having a shape obtained by dividing the annular shape into a plurality of portions in a circumferential direction according to a shape of the gas turbine nozzle having the annular flow path section, that is, a substantially rectangular shape (fan-shape) configured by inner and outer arcs and straight lines connecting both ends of those arcs, and provides a flow path connecting between the upstream section and the downstream section by a gentle curve.

On the other hand, in the gas turbine, in order to shorten a length of the rotating shaft, it is general that the combustors are disposed on an outer circumferential side of the compressor to reduce an interval between the compressor and the gas turbine.

In the structure described above, combustion air from the compressor (compressed air) passes through the outside of the transition ducts of the combustors, changes a flow direction to an upstream side (combustion chamber side) of the combustors, and flows outside the combustion liners.

The combustion air changes the flow direction again at the upstream side of the combustors and flows into the combustion liners (combustion chambers). In other words, combustion gas flows on an inner circumferential side of the connection portion between the transition ducts of the combustors and the gas turbine nozzle, while combustion air flows on an outer circumferential side of the connection portion. Since the combustion air is higher in pressure than the combustion gas flowing on the inner circumferential side of the connection portion, the combustion air flows (leaks out) from the outer circumferential side toward the inner circumferential side.

In that case, the fuel consumption is increased by a reduction of a combustion gas temperature and a change in the combustion conditions in the combustor, and the energy efficiency of the gas turbine is decreased. Also, it is feared that, with the leakage of the combustion air, the amount of air contributing to combustion decreases to cause an increase the combustion temperature in the combustion chamber, and nitrogen oxide (NOx) during combustion increases. Therefore, it has been required to suppress the leakage of the combustion air.

In order to meet a request for inhibiting a leakage of the combustion air, for example, Japanese Unexamined Patent Application Publication No. 2003-193866 discloses a sealing structure for inhibiting the leakage of the combustion air at the connection portion between the transition ducts of the combustors and the gas turbine nozzle.

In the sealing structure disclosed in Japanese Unexamined Patent Application Publication No. 2003-193866, the sealing members are placed on four side portions (four boundaries) of a portion called an aft frame having a substantially rectangular shape attached to an outlet end (a rear end) of the transition duct of each combustor, in more detail, an arcuate inner peripheral portion (lower portion) extending in a circumferential direction, an arcuate outer peripheral portion (upper portion) located radially outward from the inner peripheral portion and extending in the circumferential direction, and a pair of linear side portions extending in the radial direction across both ends of the inner peripheral portion and the outer peripheral portion.

Specifically, a seal groove is provided on an outer peripheral surface of each aft frame, and a plate-shaped sealing member called "a side seal" is sandwiched between the seal grooves of the side portions of the adjacent aft frames to seal a gap between the aft frames.

Further, a sealing member called "a floating seal" is fitted to seal grooves of the inner peripheral portion and the outer peripheral portion of the aft frame and a seal groove provided in the gas turbine nozzle to seal a gap between the transition duct and the gas turbine nozzle.

The floating seal includes a portion having a U-shaped section and a portion having a linear section extruding from the portion having the U-shaped section toward the gas turbine side, the U-shaped section portion is attached to the aft frame, and the linear section portion is fitted to the seal groove of the gas turbine nozzle.

Further, for example, WO 2007/023734 discloses a sealing structure for inhibiting a leakage of the combustion air from between the transition ducts in the connection portions between the outlet ends of the transition ducts of the multiple combustors and the gas turbine nozzle.

In the sealing structure disclosed in WO 2007/023734, there is provided a concave groove extending along facing surfaces of adjacent flanges of the transition duct outlet ends across the flange facing surfaces, a seal assembly formed of a sealing member and a leaf spring is inserted into the concave groove, the sealing member has a pair of continuous protrusions, the protrusions are disposed toward combustion gas passage side surfaces in the concave groove across the flange facing surfaces in the concave groove described above, the leaf spring is disposed so as to come into contact with the sealing member in the concave groove, and the protrusions are pressed toward the combustion gas passage side surfaces by a spring force of the leaf spring to form a sealing surface.

With the above configuration, even if a relative displacement occurs between the transition ducts due to thermal deformation caused by a temperature difference between structures under a high temperature of the combustors and vibration caused by distribution of a working fluid or the like, excellent sealing performance is maintained.

SUMMARY OF THE INVENTION

In general, in the combustors and the gas turbine, since high-temperature combustion gas flows, there is a large temperature difference between when the gas turbine is stopped and when the gas turbine is in operation. For that reason, relative positions between parts configuring the combustors and the gas turbine change due to thermal deformation of those parts.

Further, in the gas turbine, the vibration caused by the rotation of the gas turbine and the flow of the working fluid is likely to occur, and the relative positions between the parts configuring the combustors and the gas turbine change also due to the vibration.

Therefore, the sealing member used for the sealing structure in the connection portion between the transition ducts of the combustors and the gas turbine nozzle needs to have high heat resistance, rigidity, and durability in consideration of use in a high temperature environment, as disclosed in WO 2007/023734, and also needs to have flexibility capable of ensuring a sealing property by following a positional change of the transition ducts and the gas turbine nozzle. In other words, the sealing member with the above sealing structure is required to have mutually contradictory properties such as the rigidity and the flexibility.

On the other hand, in the sealing structure disclosed in Japanese Unexamined Patent Application Publication No. 2003-193866, a sealing member is placed on each of the four side portions of the aft frame having the substantially rectangular shape, a gap is provided between each sealing member and the fitting portion (sealing groove) of each sealing member in consideration with thermal deformation, and a size of the gap is adjusted or a flow path is complicated by the combination of the sealing member and the sealing groove, to thereby provide sealing performance.

Also, as in the sealing structure disclosed in Japanese Unexamined Patent Application Publication No. 2003-193866, when the sealing member is placed on each of the four sides of the aft frame, there is a need to avoid an interference between the sealing members so as to be able to maintain the sealing performance even if the thermal deformation occurs in the combustors or the like. For that reason, there is a need to displace the sealing positions from each other at the four corners of the aft frame at which the sealing members intersect (are combined) with each other.

For example, a distance (offset) is provided in an axial direction of a rotating shaft of the gas turbine between the sealing member (floating seal) to be installed on the inner peripheral portion side and the outer peripheral portion side of the aft frame and the sealing member (side seal) placed on side portions of the aft frame. In that case, even if the adjacent transition ducts are relatively displaced in the axial direction of the rotating shaft due to the thermal deformation or the like, the side seal and the floating seal do not interfere with each other by an offset.

Therefore, even if the thermal deformation occurs, each of the sealing members takes charge of only a portion of each side of the aft frame, the sealing performance of the portion of each side of the aft frame can be maintained.

As described above, there is a need to provide a gap (spacing) for avoiding the interference between the sealing members at the intersection of the side seal and the floating seal at each corner of the aft frame.

However, with the provision of the gap (spacing) for avoiding the interference between the sealing members, the combustion air flowing outside of the transition duct flows into the gas turbine nozzle through the gap provided between the corners of the adjacent aft frames from the gap.

Conventionally, since the amount of air leaking from the four corners of the aft frame of the transition duct is relatively small compared to the amount of air leaking from the four side portions of the aft frame, the sealing performance at the four corners of the aft frame has not been emphasized.

However, for the purpose of an improvement in the energy efficiency of the gas turbine and an improvement in the combustion performance, a further reduction in the leakage air in the connection portion between the outlet end of the transition duct of each combustor and the gas turbine nozzle is required.

The present invention has been made in view of the above circumstance, and therefore an object of the present invention is to provide a gas turbine combustor and a transition duct assembly capable of enhancing sealing performance at a connection portion between an outlet end of a transition duct of the gas turbine combustor and a turbine nozzle even if a gap (spacing) for avoiding an interference between sealing members is provided in a portion where a side seal and a floating seal intersect with each other at a corner of an aft frame.

In order to achieve the above object, a gas turbine combustor according to the present invention includes: a plurality of transition ducts of the gas turbine combustor through which high-temperature combustion gas flows; a plurality of aft frames that are placed along a circumferential direction on downstream sides (outlet side) of the respective transition ducts, and connected to an upstream side (nozzle side) of the gas turbine, each of the plurality of aft frames including a floating seal that seals a gap between the aft frame and the gas turbine in inner and outer peripheries of the aft frame, and a side seal that seals a gap between the aft frames adjacent to each other in a circumferential direction; and a corner seal that is placed in a gap portion provided between corner portions of the aft frames adjacent to each other in the circumferential direction, and is configured so as to seal air flowing from at least the gap portion into the gas turbine side and to be independent of the floating seal and the side seal.

According to the present invention, even if a gap (spacing) for avoiding an interference between the sealing members is provided in a portion where the side seal and the floating seal intersect with each other at the corner portion of the aft frame, sealing performance at a connection portion between the outlet end of the transition duct of the gas turbine combustor and the gas turbine nozzle can be enhanced.

DETAILED DESCRIPTION

Figure 1:
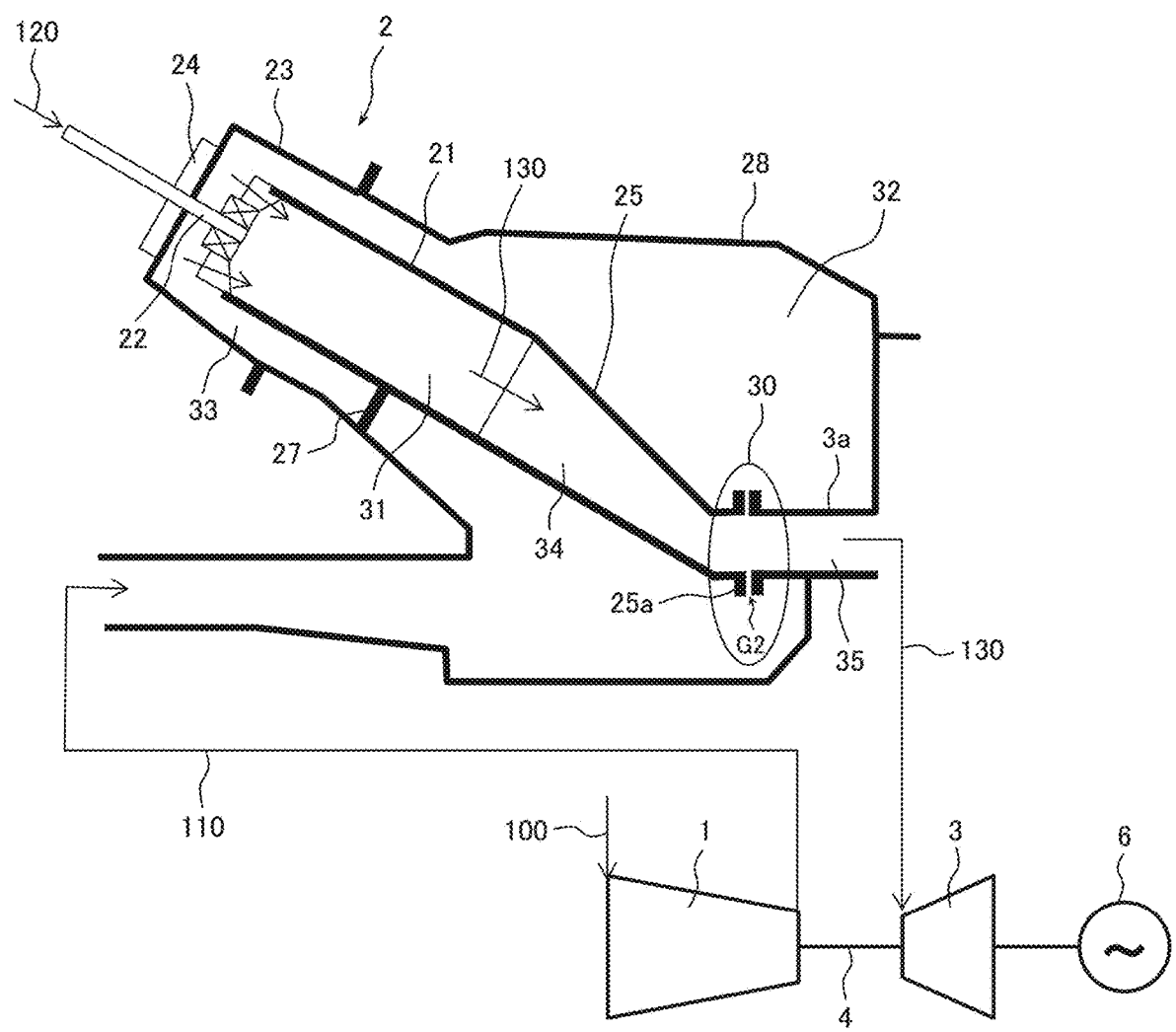
FIG. 1 is a diagram showing an overall configuration of a gas turbine combustor according to a first embodiment of the present invention.

Hereinafter, a gas turbine combustor according to the present invention will be described based on illustrated embodiments. In the drawings described below, the same reference numerals are used for the same components.

First Embodiment

Figure 2:
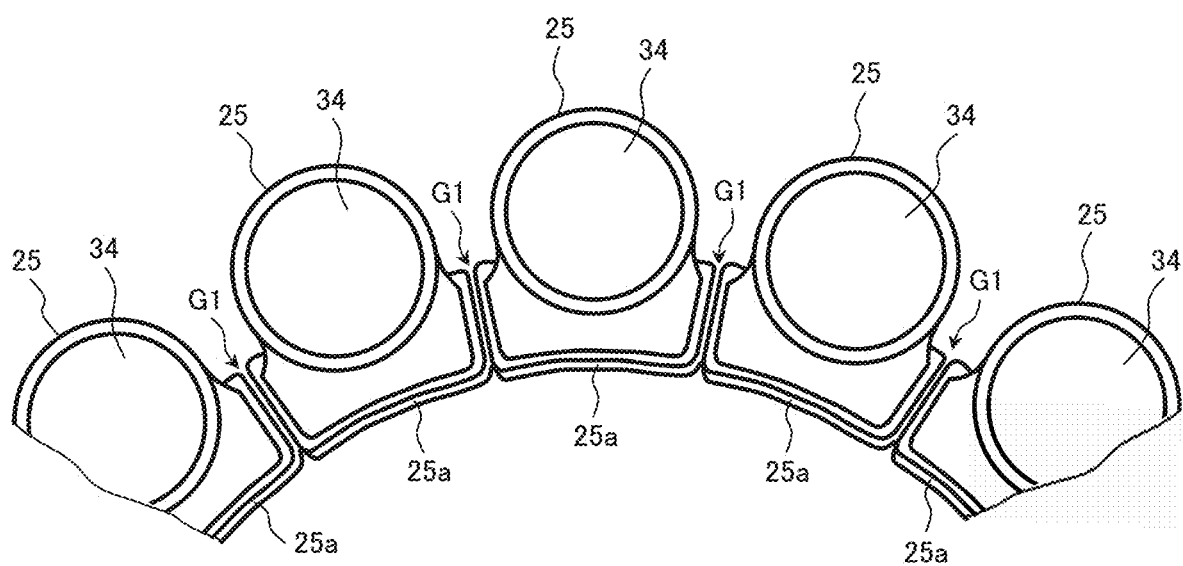
FIG. 2 is a partially cross-sectional view showing an array of transition ducts of the gas turbine combustor shown in FIG. 1 when viewed from an upstream side in a flow direction of combustion gas.

FIGS. 1 and 2 show a gas turbine combustor for a power plant as an example of a gas turbine combustor according to the present invention.

FIG. 1 shows an overall configuration of the gas turbine combustor according to a first embodiment of the present invention, and FIG. 2 is a partially cross-sectional view showing an array of transition ducts of the gas turbine combustor shown in FIG. 1 when viewed from an upstream side in a flow direction of combustion gas. In FIG. 1, the gas turbine combustor is shown such that its left side is the upstream side of the combustion gas and its right side is the downstream side of the combustion gas.

In FIG. 1, a gas turbine includes a compressor 1 that takes in and compresses outside air (atmosphere) 100 to generate high-pressure combustion air (high-pressure air) 110, multiple (only one gas turbine combustor in FIG. 1) gas turbine combustors 2 that generate high-temperature combustion gas 130 by mixing the combustion air (compressed air) 110 introduced from the compressor 1 with a fuel 120 supplied from a fuel system (not shown) and burning the mixture, and a gas turbine 3 that obtains an axial driving force by an energy of the combustion gas 130 generated by a gas turbine combustor 2.

The compressor 1 and the gas turbine 3 are connected to each other through a drive shaft 4, a generator 6 is mechanically coupled to the gas turbine 3, and the generator 6 converts the axial driving force of the gas turbine 3 into electric power.

The multiple gas turbine combustors 2 are arranged in an annular shape on an outer circumferential side of the compressor 1. In other words, the gas turbine 3 according to the present embodiment is a multi can type gas turbine, and each of the gas turbine combustors 2 is disposed to have its upstream side on the compressor 1 side (left side in FIG. 1) and its tail on the gas turbine 3 side (right side of FIG. 1).

The gas turbine combustor 2 includes a substantially cylindrical combustion liner 21 having a combustion chamber 31 therein, a fuel nozzle 22 for injecting the fuel into the combustion liner 21, a combustor casing 23 as a pressure vessel that includes the combustion liner 21, an end cover 24 that closes an opening of the combustion casing 23 on the fuel nozzle 22 side, and a transition duct 25 that connects the combustion liner 21 with a gas turbine nozzle 3a and guides the combustion gas 130 generated in the combustion chamber 31 into the gas turbine 3.

The combustor casing 23 is attached to a turbine casing 28, the turbine casing 28 stores the transition duct 25, and a space 32 into which the combustion air 110 flows from the compressor 1 is defined in the turbine casing 28. An annular air flow path 33 through which the combustion air 110 in the space 32 of the turbine casing 28 flows is provided between the combustor casing 23 and the combustion liner 21. For example, the combustion liner 21 is fixed to the turbine casing 28 by a fixing member 27.

The combustion air 110 from the compressor 1 has its flow direction reversed in the turbine casing 28 and flows toward the end cover 24 through the air flow path 33. Thereafter, the combustion air 110 reverses the flow direction again at the end cover 24 and flows into the combustion chamber 31 in the combustion liner 21. The combustion air 110 that has flowed into the combustion chamber 31 is mixed with the fuel 120 supplied from a fuel system (not shown) and burned. As a result, the combustion gas 130 is generated. The combustion gas 130 flows into the gas turbine nozzle 3a through a flow path 34 of the transition duct 25.

The gas turbine nozzle 3a described above defines a gas turbine nozzle 35 having an annular flow path cross section. In the multi can type gas turbine 3, as shown in FIG. 2, the transition ducts 25 of the multiple gas turbine combustors 2 are arranged in an annular shape, thereby being connected to the annular gas turbine nozzle 35.

When each of the transition ducts 25 becomes high in temperature with distribution of the combustion gas 130 during the operation of the gas turbine 3, it thermally expands in the circumferential, axial, and radial directions.

Therefore, a gap G1 (refer to FIG. 4 to be described later) is provided between the outlet ends 25a of the transition ducts 25 adjacent to each other to prevent an interference between the outlet ends 25a of the transition ducts 25 due to a thermal expansion in the circumferential direction.

In the same manner, a gap G2 (refer to FIG. 5 to be described later) is provided between the outlet end 25a of the transition duct 25 and the gas turbine nozzle 3a on a downstream side of the outlet end 25a to prevent an interference between the transition duct 25 and the gas turbine nozzle 3a caused by the thermal expansion of the transition duct 25 in the axial direction.

As described above, in order to prevent the interference between the outlet ends 25a of the transition ducts 25 due to the thermal expansion in the circumferential direction, the gap G1 is provided between the outlet ends 25a of the respective adjacent transition ducts 25. In addition, in order to prevent the interference between the transition duct 25 and the gas turbine nozzle 3a due to the thermal expansion of the transition duct 25 in the axial direction, the gap G2 is provided between the outlet end 25a of the transition duct 25 and the gas turbine nozzle 3a on the downstream side.

Usually, the combustion air 110 circulates in the space 32 in the turbine casing 28 containing the multiple transition ducts 25, while the combustion gas 130 circulates inside the transition ducts 25 and the gas turbine nozzle 3a.

However, since the combustion air 110 in the space 32 of the turbine casing 28 has a higher pressure than that of the combustion gas 130, some of the combustion air 110 does not go to the combustion liner 21 side, and flows (leaks out) into the gas turbine nozzle 35 side through the gap G2 between the outlet ends 25a of the transition ducts 25 and the gas turbine nozzle 3a and the gap G1 between the outlet ends 25a of the respective adjacent transition ducts 25.

Therefore, the connection portion between the outlet end 25a of the transition duct 25 and the gas turbine nozzle 3a is provided with a sealing structure 30 for preventing the combustion air 110 from flowing (leaking out) toward the gas turbine nozzle 35 side.

Figure 3:
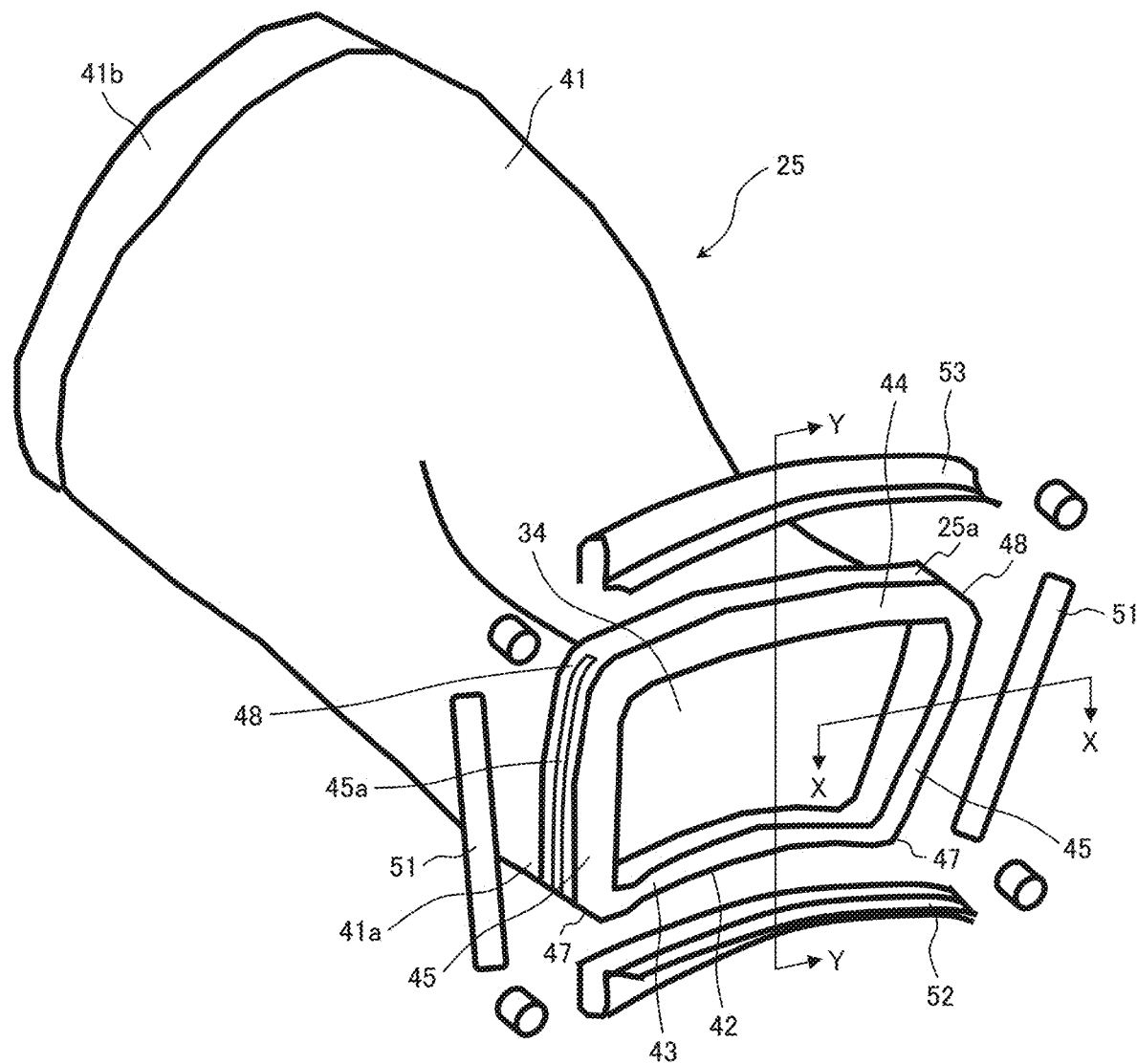
FIG. 3 is a perspective view showing an outlet side of the transition duct in a gas turbine combustor according to the first embodiment of the present invention, in which a sealing member is exploded.
Figure 4:
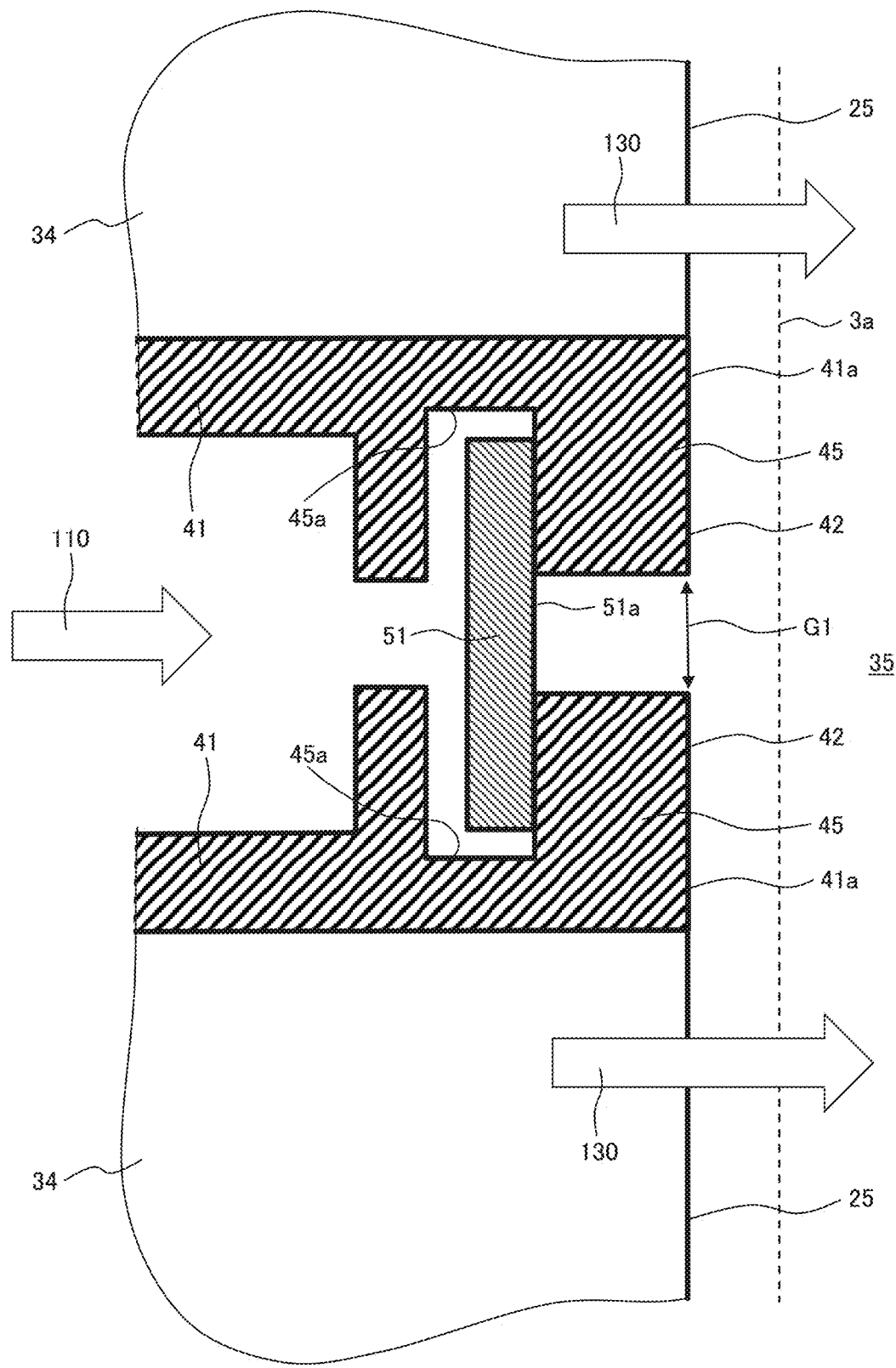
FIG. 4 is a cross-sectional view taken along a line X-X in FIG. 3.
Figure 5:
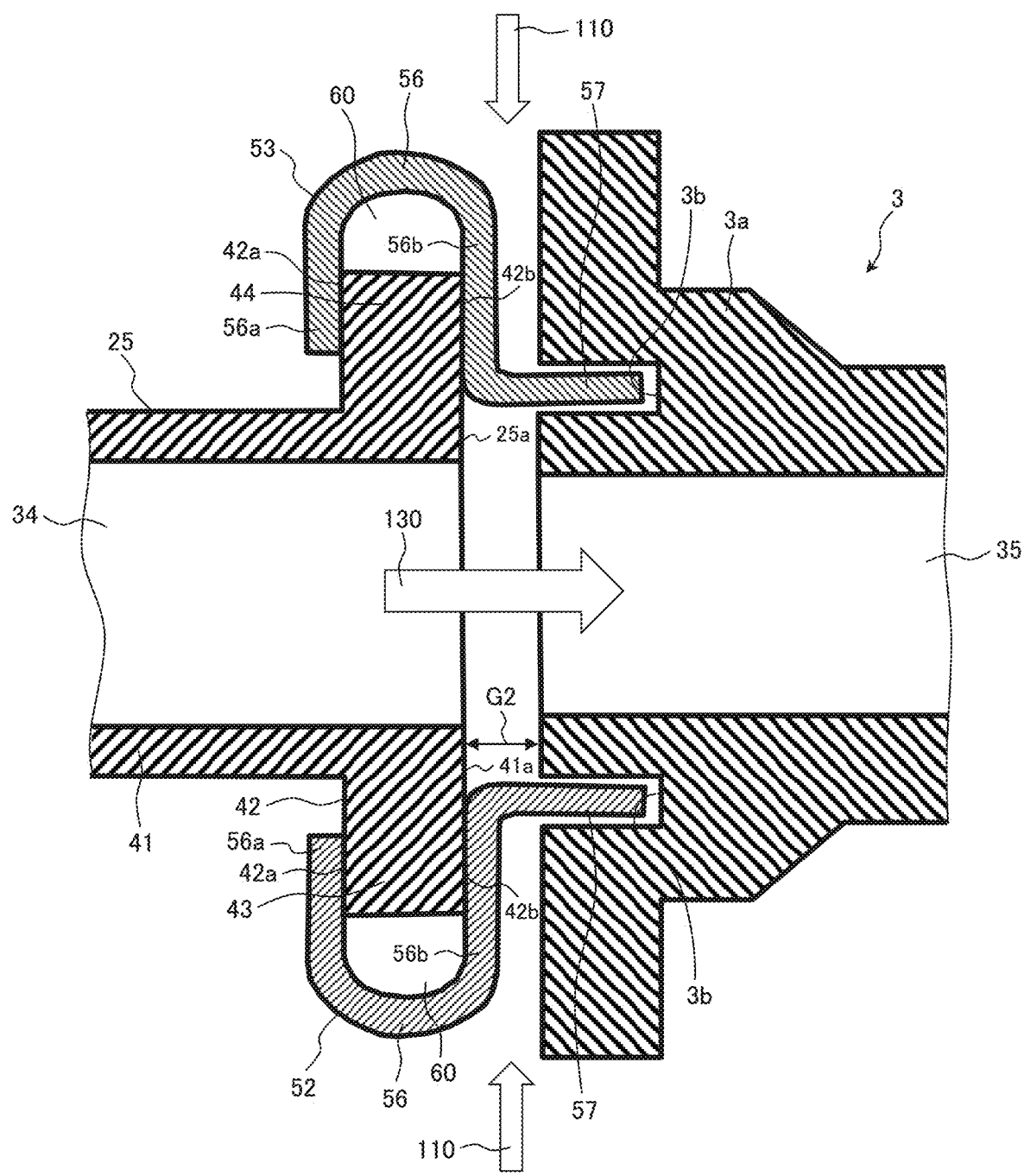
FIG. 5 is a cross-sectional view taken along a line Y-Y in FIG. 3.

The sealing structure 30 will be described with reference to FIGS. 3 to 5. FIG. 3 is a perspective view showing an outlet end 25a of the transition duct 25 in the gas turbine combustor 3 according to a first embodiment of the present invention, in which the sealing structure 30 is exploded. FIG. 4 is a cross-sectional view taken along a line X-X in FIG. 3. FIG. 5 is a cross-sectional view taken along a line Y-Y in FIG. 3.

In FIG. 3, each transition duct 25 includes a cylindrical main body 41 that forms the flow path 34 in the transition duct 25, which guides the combustion gas 130 to the gas turbine nozzle 35 inside, and a transition duct frame 42 that is placed so as to surround an outer periphery (along an outer peripheral surface) of an outlet (downstream) end 41a of the cylindrical main body 41, and configures the aft frame connected to the gas turbine nozzle 35, which is an upstream side (nozzle side) of the gas turbine 3. The transition duct frame (aft frame) 42 may be an integral part formed integrally with the cylindrical main body 41, or may be another part joined to the outlet end 41a of the cylindrical main body 41 by welding or the like.

An inlet end 41b of the cylindrical main body 41 described above is engaged with the downstream end of the combustion liner 21, and has a substantially circular flow path cross-section depending on the cylindrical combustion liner 21. In addition, the outlet end 41a (which is also the transition duct frame (aft frame) 42) of the cylindrical main body 41 is connected to the gas turbine nozzle 3a providing the gas turbine nozzle 35, and has a flow path cross-section shaped to divide the annular shape into multiple pieces in a circumferential direction according to the shape of the gas turbine nozzle 35 having the annular flow path cross-section.

In other words, the flow path cross-section of the outlet end 41a (which is also the transition duct frame (aft frame) 42) of the cylindrical main body 41 is formed in a substantially rectangular (fan) shape configured by radially inner and radially outer arcs and straight lines connecting both ends of those arcs to each other.

On the other hand, the flow path 34 in the transition duct 25 is formed by connecting a flow path cross-section of the inlet end 41b of the cylindrical main body 41 and a flow path cross-section of the outlet end 41a of the cylindrical main body 41 by a gentle curve.

Moreover, the transition duct frame 42 includes an inner transition duct frame portion 43, an outer transition duct frame portion 44, and a pair of side transition duct frame portions 45.

The inner transition duct frame portion 43 described above is an arcuate portion that is disposed at a radial position corresponding to a radially inner edge side of the gas turbine nozzle 35, and extends in the circumferential direction. In addition, the outer transition duct frame portion 44 is an arcuate portion that is located at a radially outer side of the inner transition duct frame portion 43, and extends in the circumferential direction. Further, the pair of side transition duct frame portions 45 is straight portions that are disposed between both ends of the inner transition duct frame portion 43 in the circumferential direction and both ends of the outer transition duct frame portion 44 in the circumferential direction, and extend in the radial direction.

As shown in FIGS. 3 and 4, opposite surfaces of the adjacent side transition duct frame portions 45 of the transition duct frame 42 are each provided with a side seal groove 45a extending along the radial direction (extension direction of the side transition duct frame portions 45).

Further, in order to seal the gap G1 between the adjacent side transition duct frame portions 45 of the transition duct frame 42, side seals 51 are provided. The side seals 51 are disposed to extend across both the side seal grooves 45a of the adjacent side transition duct frame portions 45 and extend along both the side seal grooves 45a.

The side seal 51 is formed of a long flat plate member made of, for example, a cobalt-based alloy, and has a downstream surface 51a on the gas turbine nozzle 3a side.

As shown in FIG. 4, the side seal 51 described above is pressed toward a wall surface on the gas turbine nozzle 35 side of a pair of wall surfaces defining the side seal grooves 45a due to a pressure difference between the combustion air 110 flowing in a space between the adjacent transition ducts 25 and the combustion gas 130 (lower in pressure than the combustion air 110) flowing from the flow path 34 in the transition duct 25 toward the gas turbine nozzle 35.

As described above, the combination of the side seal 51 with the side seal grooves 45a of the side transition duct frame portions 45 makes it possible to inhibit the combustion air 110 flowing outside the transition duct 25 from flowing into the gas turbine nozzle 35.

In addition, since a space, that is, a so-called "allowance" is provided between the side seal 51 and the side seal grooves 45a of the side transition duct frame portions 45, even if a relative position of the adjacent side seal grooves 45a changes due to thermal deformation or vibration of the transition duct 25, the combustion air 110 in the space 32 of the turbine casing 28 containing the transition duct 25 can be inhibited from flowing into the gas turbine nozzle 35 while inhibiting the deformation and abrasion of the side seals 51.

Further, as shown in FIGS. 3 and 5, in order to seal the gap G2 between the inner transition duct frame portion 43 and the gas turbine nozzle 3a, an inner circumferential side floating seal 52 is disposed to extend across the inner transition duct frame portion 43 and the gas turbine nozzle 3a.

The inner circumferential side floating seal 52 extends along the inner transition duct frame portion 43 and has one side engaged with the inner transition duct frame portion 43 and the other side engaged with a radially inner portion of the gas turbine nozzle 3a.

Further, in order to seal the gap G2 between the outer transition duct frame portion 44 and the gas turbine nozzle 3a, an outer circumferential side floating seal 53 is disposed to extend across the outer transition duct frame portion 44 and the gas turbine nozzle 3a.

The outer circumferential side floating seal 53 extends along the outer transition duct frame portion 44, and has one side engaged with the outer transition duct frame portion 44 and the other side engaged with a radially outer portion of the gas turbine nozzle 3a.

Specifically, as shown in FIG. 5, floating seal grooves 3b are provided on respective inlet end surfaces facing downstream end surfaces of the inner transition duct frame portion 43 and the outer transition duct frame portion 44 of the transition duct frame 42 in the gas turbine nozzle 3a.

The inner circumferential side floating seal 52 and the outer circumferential side floating seal 53 are each configured by a first engagement portion 56 formed in a U-shaped lateral cross-section and having an upstream leg portion 56a and a downstream leg portion 56b, and a second engagement portion 57 having a straight lateral cross-section which is bent from the downstream leg portion 56b of the first engagement portion 56 to the outside substantially at a right angle and extends.

Incidentally, the inner circumferential side floating seal 52 and the outer circumferential side floating seal 53 are each made of, for example, cobalt-based alloy having a high wear resistance at a high temperature and flexibility.

In addition, in the outer circumferential side floating seal 53, the upstream leg portion 56a and the downstream leg portion 56b of the first engagement portion 56 sandwich the upstream end surface and the downstream end surface of the outer transition duct frame portion 44 so that the first engagement portion 56 is brought in close contact with the outer transition duct frame portion 44, and the second engagement portion 57 is inserted into the floating seal groove 3b of the gas turbine nozzle 3a.

The second engagement portion 57 of the outer circumferential side floating seal 53 is disposed with a gap in the floating seal groove 3b of the gas turbine nozzle 3a so that even if a relative position between the transition duct 25 and the gas turbine nozzle 3a changes due to thermal deformation, the combustion air 110 in a space of the turbine casing 28 can be inhibited from flowing into the gas turbine nozzle 35 while preventing an interference between the transition duct 25 and the gas turbine nozzle 3a.

In addition, as with the inner circumferential side floating seal 52, since the outer circumferential side floating seal 53 is configured to sandwich the inner transition duct frame portion 43 by the first engagement portion 56 having the U-shaped cross section, even if the outer circumferential side floating seal 53 per se and the outer transition duct frame portion 44 are thermally deformed, the adhesion between the outer circumferential side floating seal 53 and the inner transition duct frame portion 43 can be maintained.

In addition, the outer transition duct frame portion 44 of the transition duct frame 42 with which the outer circumferential side floating seal 53 comes into contact can also be made of a material having high wear resistance, thereby being capable of inhibiting abrasion caused by thermal deformation or vibration.

Although not described in detail particularly, the same as the outer circumferential side floating seal 53 applies to the inner circumferential side floating seal 52.

Further, in the inner circumferential side floating seal 52, the outer circumferential side floating seal 53, and the side seal 51, even if a relative position between the respective adjacent transition ducts 25 and a relative position between the transition duct 25 and the gas turbine nozzle 3a change due to the thermal deformation and the vibration, sealing positions are deviated from each other without being coupled to each other in order to avoid a mutual interface.

Specifically, as shown in FIG. 5, the inner circumferential side floating seal 52 and the outer circumferential side floating seal 53 come into contact with the downstream end surfaces of the inner transition duct frame portion 43 and the outer transition duct frame portion 44 of the transition duct frame 42 of the transition duct 25, respectively.

On the other hand, as shown in FIG. 4, the side seal 51 comes into contact with the side seal groove 45a provided in the side transition duct frame portion 45 of the transition duct frame 42. In other words, the sealing positions of the inner circumferential side floating seal 52 and the outer circumferential side floating seal 53 are relatively deviated to the gas turbine nozzle 3a side of the sealing position of the side seal 51.

Incidentally, in the sealing structure 30 configured as described above, leakage air flows into a space 60 defined by covering (surrounding) a radially leading end of the outer transition duct frame portion 44 with the outer circumferential side floating seal 53 having the U-shaped cross section.

Hereinafter, the above mechanism will be described.

An internal and external pressure difference due to a pressure difference between the combustion gas 130 and the combustion air 110 acts on the outer circumferential side floating seal 53 described above. Moreover, the outer circumferential side floating seal 53 is formed such that the downstream leg portion 56b of the first engagement portion 56 is longer (larger area) and the upstream leg portion 56a of the first engagement portion 56 is shorter (smaller area).

Therefore, a load is imposed on the connection portion between the transition duct 25 and the gas turbine nozzle 35 in an upstream direction (from right to left in FIG. 5) due to a pressure difference between the combustion gas 130 and the combustion air 110.

Accordingly, a downstream touch surface 42b between the outer transition duct frame portion 44 and the outer circumferential side floating seal 53 is firmly pressed in the upstream direction (from the right to the left in FIG. 5), so that the leakage is less likely to occur.

On the other hand, since an upstream touch surface 42a between the outer transition duct frame portion 44 and the outer circumferential side floating seal 53 is not subject to a load in the upstream direction (from right to left in FIG. 5), the upstream touch surface 42a is not pressed in the upstream direction so that the leakage is likely to occur.

For that reason, as some of the combustion air, air leaked from the gap occurring in the upstream touch surface 42a flows into the space 60 defined by covering (surrounding)

the radially leading end of the outer transition duct frame portion 44 with the outer circumferential side floating seal 53 having the U-shaped cross section.

Further, a support member (hinge) for fixing the transition duct 25 to the turbine casing 28 is usually attached to the outer transition duct frame portion 44. In order to avoiding the outer circumferential side floating seal 53 from interfering with the support member, a notch is provided in the center of the outer circumferential side floating seal 53, and air leaked from a gap between the notch and the support member flows into the space 60.

The leakage air flowing into the space 60 described above is less likely to flow out from the downstream touch surface 42b because the outer circumferential side floating seal 53 is pressed toward the outer transition duct frame portion 44 in the upstream direction by a pressure difference between the combustion gas 130 and the combustion air 110.

Accordingly, the leakage air flows toward the frame corner portion 48 in a circumferential direction of the transition duct frame (aft frame) 42. In addition, the side seals 51 are located on an upstream side of the downstream end of the outer circumferential side floating seal 53. Hence, the leakage air flowing into the frame corner portion 48 flows downstream of the side seals 51.

Also, since the downstream leg portion 56b of the first engagement portion 56 of the outer circumferential side floating seal 53 is present on the downstream side of the frame corner portion 48, a flow direction of the leakage air changes from an outer periphery to an inner periphery, and again changes in the downstream direction on an inner periphery of the first engagement portion 56 of the outer circumferential side floating seal 53, and the leakage air flows out.

Figure 6:
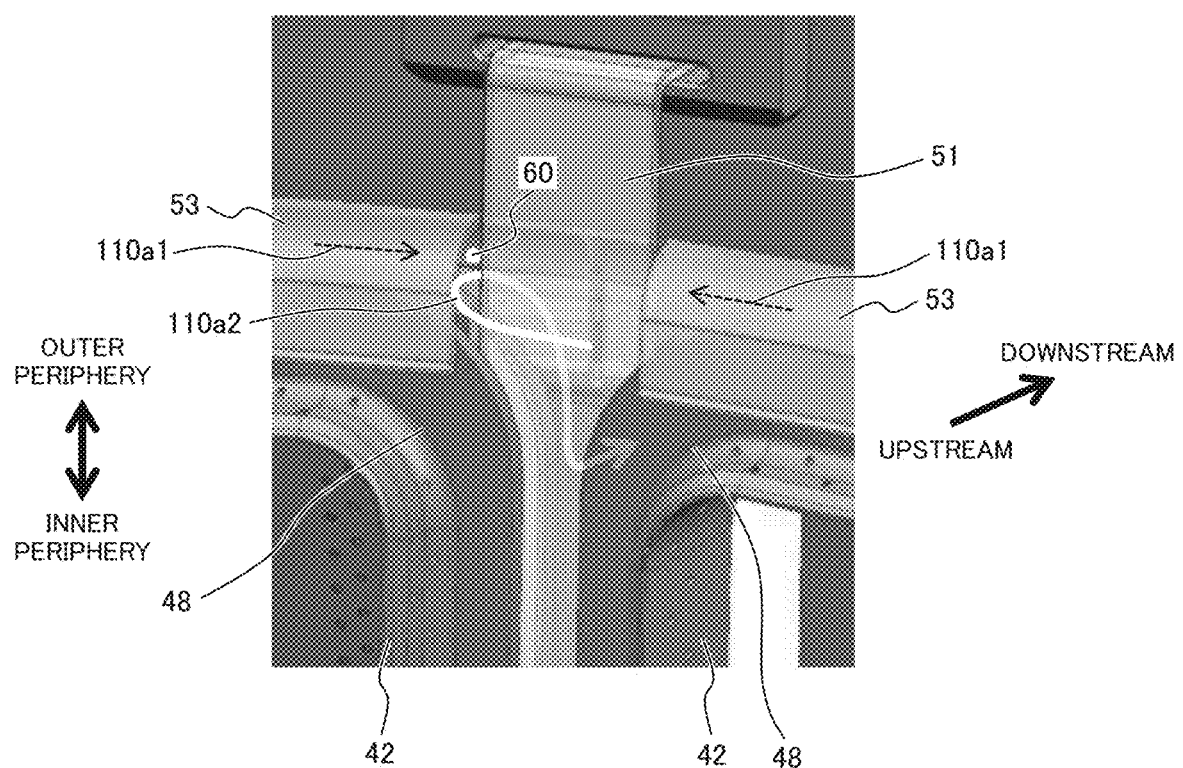
FIG. 6 is a partial perspective view showing a corner portion of transition duct frames (aft frames) adjacent to each other in a circumferential direction in a conventional gas turbine combustor.

In other words, as shown in FIG. 6, the leakage air flowing into the space 60 between the transition duct frame (aft frame) 42 and the outer circumferential side floating seal 53 flows toward the inner periphery from the outer periphery of the gas turbine 3 in a space on the downstream side of the side seal 51, and further changes its direction to the downstream side and flows.

Figure 7:
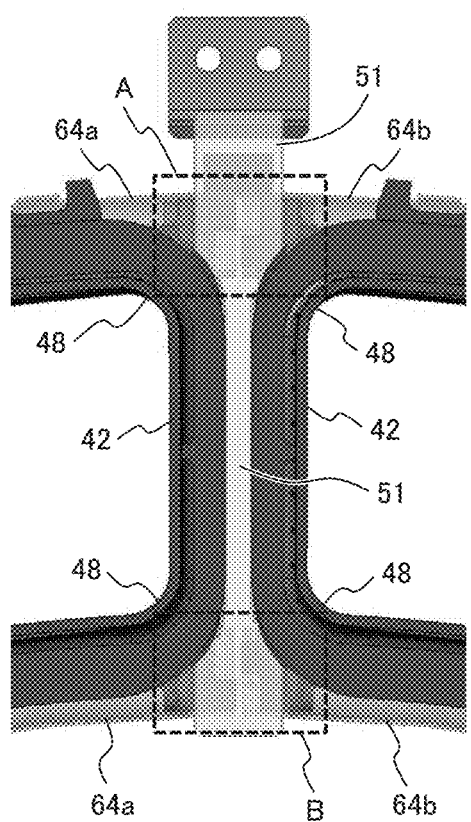
FIG. 7 is a diagram showing a portion between the transition duct frames (aft frames) in the gas turbine combustor according to the first embodiment of the present invention.
Figure 8:
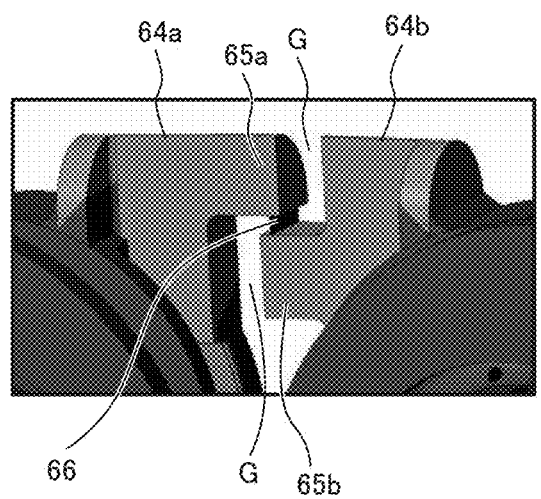
FIG. 8 is an enlarged perspective view showing a portion A of FIG. 7.
Figure 9:
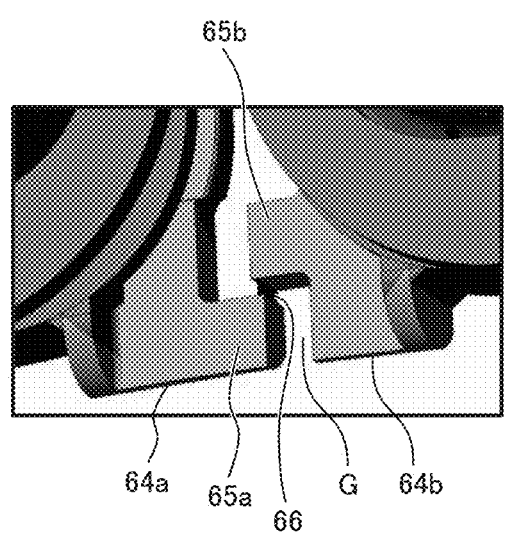
FIG. 9 is an enlarged perspective view showing a portion B of FIG. 7.

Therefore, in the present embodiment, as shown in FIGS. 7, 8 and 9, shoulder sealing portions 64a and 64b, which are corner sealing portions for sealing the leakage air leaking from the gap G toward the gas turbine 3 side, are placed in the gap G provided between the frame corner portions 48 adjacent to each other in the circumferential direction. The shoulder sealing portions 64a and 64b are configured separately independent of the outer circumferential side floating seal 53 and the side seals 51.

Air that leaks toward the gas turbine 3 side from a gap provided between the frame corner portions 48 of the aft frame, which is sealed with the shoulder sealing portions 64a and 64b described above, is leakage air flowing from a circumferential direction of the aft frame and the axial directions 110a and 110a2 (refer to FIG. 6).

Also, the shoulder sealing portions 64a and 64b, which are corner sealing portions, are placed opposite to each other in the circumferential direction of the frame corner portions 48 of the respective aft frames, and side seals 51 extending radially from between the transition duct frames (aft frames) 42 across both the shoulder sealing portions 64a and 64b are located between the shoulder sealing portions 64a and 64b placed opposite to each other in the circumferential direction of the frame corner portions 48 of the respective transition duct frames (aft frames) 42.

Further, the respective shoulder sealing portions 64a and 64b placed opposite to each other in the circumferential direction of the frame corner portions 48 of the respective transition duct frames (aft frames) 42 close a circumferential outlet of the space 60 defined by covering the radial leading end of the transition duct frame (aft frame 42) with the outer circumferential side floating seal 53 having the U-shaped cross-section, and seal (close) the leakage air flowing into the space 60.

With the above configuration, the leakage air flowing into the space 60 is prevented from flowing into the space downstream of the side seals 51.

Next, details of the shoulder sealing portion 64a which is employed in the present embodiment will be described with reference to FIG. 10.

Figure 10:
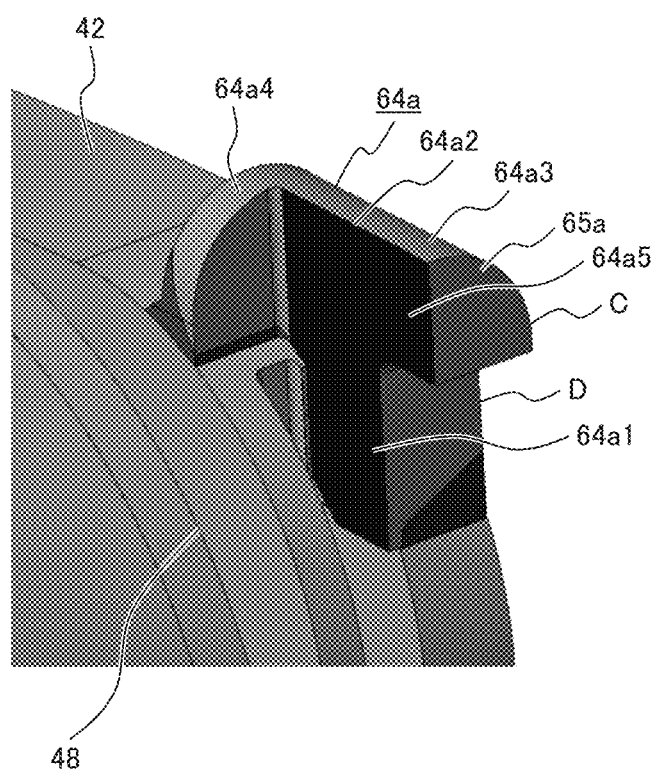
FIG. 10 is a partial perspective view showing a corner portion of a transition duct frame (aft frame) indicating a corner sealing portion employed in the gas turbine combustor according to the first embodiment of the present invention.

As shown in FIG. 10, the shoulder sealing portion 64a employed in the present embodiment includes a block 64a3 formed in a substantially T-shape by a straight portion 64a1 extending in a radial direction (vertical direction in FIG. 7) and a horizontal portion extending from both ends of the straight portion 64a1 in the circumferential direction (horizontal direction in FIG. 7), and a fixing portion 64a4 that fixes the block 64a3 to the frame corner portion 48 of the transition duct frame (aft frame) 42.

A surface 64a5 of the straight portion 65a1 and the horizontal portion 64a2 of the T-shape of the block 64a3 on the gas turbine side (lower left oblique direction in FIG. 10) is formed in a planar shape, and the block 64a3 includes a first block C having a thickness continuously from the planar portion of the surface 64a5 and formed in a curved shape at an outermost circumferential side on an opposite side (upper right oblique direction in FIG. 10) of the horizontal portion 64a2 of the T-shape of the block 64a3 formed in a plane to the gas turbine side, and a second block D formed in a square pillar having a thickness continuously from the planar portion of the surface 64a5 on an opposite side of the straight surface 64a1 of the T-shape of the block formed in the plane to the gas turbine side.

In addition, according to the present embodiment, one shoulder sealing portion 64a and the other shoulder sealing portion 64b, which are placed opposite to each other in the circumferential direction of the frame corner portions 48 of the respective transition duct frames (aft frames) 42, are disposed such that the other shoulder sealing portion 64b is disposed in an inverted T shape based on the one shoulder sealing portion 64a. The one and other shoulder sealing portions 64a and 64b each have one end of the horizontal portion 64a2 of the T-shape fixed to the frame corner portion 48 of the transition duct frame (aft frame) 42 through the fixing portion 64a4 formed integrally with the block 64a3, and the straight portion 64a1 of the T-shape of the block 64a3 fixed directly to the frame corner portion 48 of the transition duct frame (aft frame) 42.

Figure 11A:
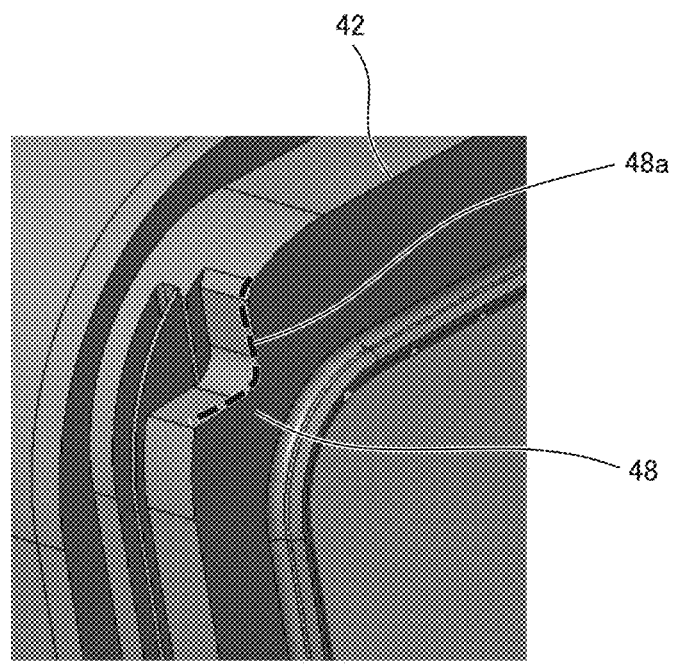
FIG. 11A is a partial perspective view showing an upper corner portion of the transition duct frame (aft frame) before the corner sealing portion is placed in the gas turbine combustor according to the first embodiment of the present invention.
Figure 11B:
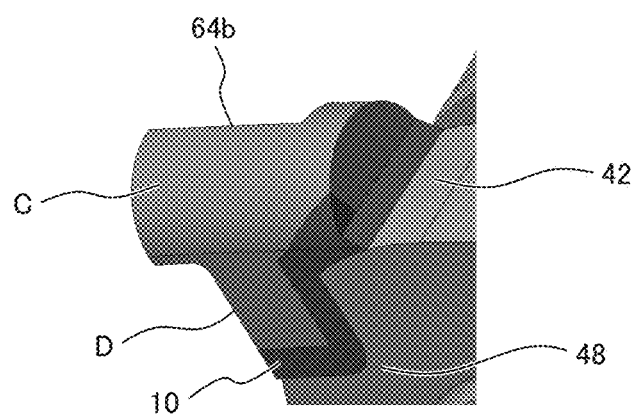
FIG. 11B is a partial perspective view showing a state in which the corner sealing portion is placed and fixed at the corner portion of the transition duct frame (aft frame) in FIG. 11A.
Figure 12A:
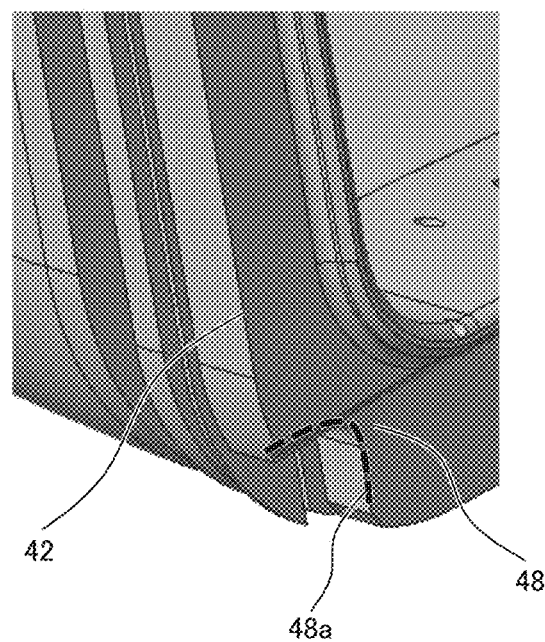
FIG. 12A is a partial perspective view showing a lower corner portion of the transition duct frame (aft frame) before the corner sealing portion is placed in the gas turbine combustor according to the first embodiment of the present invention.
Figure 12B:
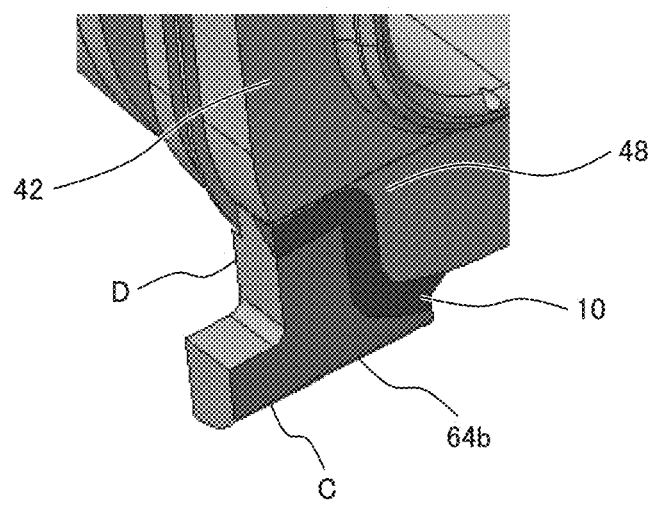
FIG. 12B is a partial perspective view showing a state in which the corner sealing portion is placed and fixed at the corner portion of the transition duct frame (aft frame) in FIG. 12A.

Specifically, as shown in FIGS. 11A and 12A, each frame corner portion 48 of the transition duct frame (aft frame) 42 is provided with an L-shaped notch (groove) 48a for positioning the shoulder sealing portions 64a and 64b, and as shown in FIGS. 11B and 12B, the shoulder sealing portion 64b (64a) is fixed to the L-shaped notch (groove) 48a by welding 10.

The respective welding positions of the transition duct frames 42 adjacent to each other in the circumferential direction can be set to the same height by the L-shaped notch (groove) 48a for positioning the shoulder sealing portions 64a and 64b. The shoulder sealing portions 64a and 64b are welded from the outlet side of the transition duct frame 42.

As a result, the shoulder sealing portions 64a and 64b can be fixed to the transition duct frame 42 without disassembling a flow sleeve.

Further, in the frame corner portion 48 of the transition duct frame (aft frame) 42, the side seals 51 are disposed along the planar portion (64a5) of the block 64a3 of the shoulder sealing portion 64b (64a).

In addition, the shoulder sealing portions 64a and 64b placed opposite to each other in the circumferential direction of the frame corner portions 48 of the respective transition duct frames (aft frames) 42 are provided with convexes 65a and 65b, which are parts of the T-shaped horizontal portion 64a2 of the block 64a3 protruding toward the adjacent transition duct frames (aft frames) 42 side, respectively (refer to FIGS. 8 and 9), and the convexes 65a and 65b provided in the respective adjacent shoulder sealing portions 64a and 64b are offset to each other in the radial direction of the transition duct frame (aft frame) 42, to thereby provide a stepped portion 66 (refer to FIGS. 8 and 9).

As a result, since the leakage air slipping through the shoulder sealing portions 64a and 64b (leakage air 110a1 flowing in the circumferential direction of the aft frame, leakage air 110a2 flowing in an axial direction of the aft frame, and leakage air from a gap defined by each of the inner circumferential side floating seal 52 and the outer circumferential side floating seal 53 on a rear side of the side seal 51) passes through a stepped portion 66 while moving from an outer periphery of the gas turbine 3 toward an inner periphery (from top to bottom in FIG. 10), the stepped portion 66 makes it possible to prevent the leakage air from flowing into the downstream side.

Further, a circumferential end of the shoulder seal fixing portion 64a4 is formed with a semi-cylindrical closing surface along the shapes of the inner circumferential side floating seal 52 and the outer circumferential side floating seal 53. The semi-cylindrical closing surface prevents the leakage air flowing in the circumferential direction in both directions along the inside of the inner circumferential side floating seal 52 and the outer circumferential side floating seal 53, and the leakage air flowing from the axial direction of the aft frame from wrapping around a rear side of the side seal 51.

Further, even when the shoulder sealing portions 64a and 64b are thermally expanded in the circumferential direction, the convexes 65a and 65b do not come into contact with each other. Furthermore, since the stepped portion 66 is formed on the downstream side of the side seal 51, and the leakage air flowing into the downstream side can be reduced.

Further, the leading ends of the convexes 65a and 65b formed in the respective shoulder sealing portions 64a and 64b forming the stepped portion 66 are disposed with a predetermined gap G from the shoulder sealing portions 64a and 64b placed opposite to each other in the circumferential direction of the frame corner portions 48 of the respective transition duct frames (aft frames) 42.

With the presence of the gap G, the shoulder sealing portions 64a and 64b are easily assembled in the frame corner portions 48 of the respective transition duct frames (aft frames) 42.

Further, the convexes 65a and 65b provided in the shoulder sealing portions 64a and 64b placed opposite to each other in the circumferential direction of the frame corner portions 48 of the respective transition duct frames (aft frames) 42 overlap with each other in the circumferential direction of the transition duct frames 42.

This is because the convexes 65a and 65b overlap with each other due to thermal elongation during operation, and the convexes 65a and 65b overlap with each other, so that the inflow of leakage air to the downstream can be reduced further.

Also, the radial position of the stepped portion 66 provided in the left and right of the frame corner portions 48 of the outer transition duct frame portion 44 is located on an outer circumferential side of the innermost periphery of the outer circumferential side floating seal 53. In other words, the radial position of the stepped portion 66 is inserted inside of the U-shaped portion of the outer circumferential side floating seal 53.

Conversely, the radial position of the stepped portions 66 provided in the respective shoulder sealing portions 64a and 64b of the inner transition duct frame portion 43 of the gas turbine combustor 2 is located inside the outermost periphery of the inner circumferential side floating seal 52. In other words, the radial position of the stepped portion 66 provided in the left and right frame corner portions 48 of the inner transition duct frame portion 43 are located on an inner circumferential side of the outermost periphery of the inner circumferential side floating seal 52. This is essential for reduction of the leakage.

With the configuration of the present embodiment described above, even if a gap (spacing) for avoiding an interference between the sealing members is provided in an intersection portion of the side seals 51 and the inner circumferential side and outer circumferential side floating seals 52 and 53 at the corner of the transition duct frame (aft frame) 42, the sealing performance of the connection portion between the outlet end 25a of the transition duct 25 and the gas turbine nozzle 3a in the gas turbine combustor can be enhanced.

Further, since the surface 64a5 of the straight portion 64a1 and the horizontal portion 64a2 of the T-shape of the block 64a3 on the gas turbine side (lower left oblique direction in FIG. 10) is formed in a planar shape, the workability of welding and fixing the shoulder sealing portions 64a and 64b is improved.

Second Embodiment

Figure 13:
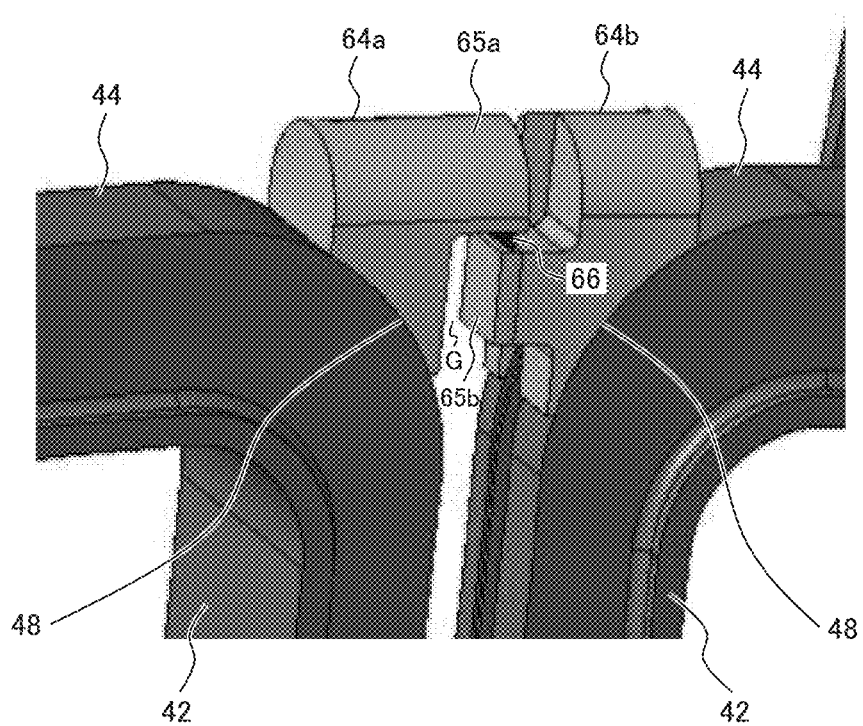
FIG. 13 is a partial perspective view showing a corner portion of aft frames adjacent to each other in a circumferential direction in a gas turbine combustor according to a second embodiment of the present invention.

FIG. 13 shows a frame corner portion of adjacent transition duct frames (aft frames) 42 in a circumferential direction in a gas turbine combustor according to a second embodiment of the present invention.

In the present embodiment shown in FIG. 13, in the shoulder sealing portions 64a and 64b described in the first embodiment, two flat portions of a block 64a3 are disposed opposite to each other in a flow direction of a combustion gas 130 across side seals 51.

Even in the present embodiment described above, sealing performance of a connection portion between an outlet end 25a of a transition duct 25 of a gas turbine combustor and a gas turbine nozzle 3a can be enhanced.

In addition, the present invention is not limited to the embodiments described above, and includes various modifications. For example, the embodiments described above have been described in detail for easy understanding of the present invention, and are not necessarily limited to those having all the configurations described. Also, a part of the configuration of one embodiment can be replaced with the configuration of another embodiment, and the configuration of one embodiment can be added with the configuration of another embodiment. In addition, a part of the configuration of each embodiment can be subjected to addition, deletion, and replacement of another configuration.

LIST OF REFERENCE SIGNS

1 . . . compressor, 2 . . . gas turbine combustor, 3 . . . gas turbine, 3a . . . gas turbine nozzle, 3b . . . floating seal groove, 4 ... drive shaft, 6 ... generator, 10 ... welding, 21 ... combustion liner, 22 ... fuel nozzle 23 ... combustor casing, 24 ... end cover, 25 ... transition duct 25, 25a ... outlet end of the transition duct, 27 ... fixing member, 28 ... cable, 30 ... sealing structure, 31 ... combustion chamber, 32 ... casing space, 33 ... air flow path, 34 ... transition duct flow path, 35 ... gas turbine nozzle, 41 ... cylindrical main body, 41a ... outlet end of cylindrical main body, 41b ... inlet end of cylindrical main body, 42 ... transition duct frame (aft frame), 42a ... upstream touch panel between outer transition duct frame portion and outer circumferential side floating seal, 42b ... downstream touch surface between outer transition duct frame portion and outer circumferential side floating seal, 43 ... inner transition duct frame portion, 44 ... outer transition duct frame portion, 45 ... side transition duct frame portion, 45a ... side seal groove, 48 ... frame corner portion, 48a ... L-shaped notch (groove), 51 ... side seal, 51a ... downstream surface of side seal, 52 ... inner circumferential side floating seal, 53 ... outer circumferential side floating seal, 56 ... first engagement portion, 56a ... upstream leg of first engagement portion, 56b ... downstream leg of first engagement portion, 57 ... second engagement portion, 60 ... space surrounded by transition duct space frame and floating seal, 64a, 64b ... shoulder sealing portion, 64a1 ... straight portion of shoulder sealing portion, 64a2 ... horizontal portion of shoulder sealing portion, 64a3 ... block of shoulder sealing portion, 64a4 ... fixed portion of shoulder sealing portion, 65a, 65b ... convex of shoulder sealing portion, 66 ... stepped portion, 100 ... outside air, 110 ... Combustion air, 110a1, 110a2 ... leakage air, 120 ... fuel, 130 ... combustion gas.

What is claimed is:

1. A gas turbine combustor comprising:
a plurality of transition ducts of the gas turbine combustor through which high-temperature combustion gas flows;
a plurality of aft frames that are placed along a circumferential direction on a downstream side of the respective transition ducts, and connected to an upstream side of a gas turbine, each of the plurality of aft frames including at least one floating seal that seals a first gap between the respective aft frame of the plurality of aft frames and the gas turbine in at least one of inner and outer peripheries of the respective aft frame, and a side seal that seals a second gap between aft frames adjacent to each other in the circumferential direction; and
a corner seal that is placed in a gap portion provided between corner portions of the aft frames adjacent to each other in the circumferential direction, and is configured to seal air flowing from at least the gap portion into a gas turbine side, and the corner seal is configured to be separately independent of the at least one floating seal and the side seal and the corner seal is fixed to one of the aft frames adjacent to each other in the circumferential direction by welding;
wherein the corner seal includes at least two shoulder seals, and the at least two shoulder seals are placed opposite to each other in the circumferential direction of the corner portion of each of the aft frames adjacent to each other in the circumferential direction and are fixed respectively to each of the aft frames adjacent to each other in the circumferential direction by welding, and the side seal, extending radially between the aft frames adjacent to each other across the at least two shoulder seals, is placed between the at least two shoulder seals placed opposite to each other in the circumferential direction of the corner portion of each of the aft frames adjacent to each other;
wherein a first shoulder seal of the at least two shoulder seals placed opposite to each other in the circumferential direction of the corner portion of each of the aft frames adjacent to each other includes a block formed in a T-shape by a straight portion extending in a radial direction and a horizontal portion extending from an end of the straight portion in the circumferential direction, and a fixing portion that fixes the block to the corner portion of the respective aft frame,
surfaces of the straight portion and the horizontal portion of the T-shape of the block on the gas turbine side are formed in a planar portion, and
the block includes a first block having a first continuous thickness from the planar portion and formed in a curved shape at an outermost circumferential side on an opposite side of the horizontal portion of the T-shape of the block formed in a plane to the gas turbine side, and a second block formed in a square pillar having a second continuous thickness from the planar portion on an opposite side of the straight portion of the T-shape of the block formed in the plane to the gas turbine side.

2. The gas turbine combustor according to claim 1, wherein the corner seal is configured to seal leakage air from the circumferential direction and an axial direction of the aft frames adjacent to each other.

3. The gas turbine combustor according to claim 1, wherein each of the at least two shoulder seals placed opposite to each other in the circumferential direction of the corner portion of each of the aft frames adjacent to each other closes a circumferential outlet of a space provided by covering a radial leading end of each of the aft frames adjacent to each other with the at least one floating seal of each of the aft frames having a U-shaped cross section, and seals leakage air flowing into the space.

4. The gas turbine combustor according to claim 1,
wherein the first shoulder seal and a second shoulder seal of the at least two shoulder seals placed opposite to each other in the circumferential direction of the corner portion of each of the aft frames adjacent to each other are disposed in a state where the second shoulder seal is disposed in an inverted T-shape based on the T-shape of the first shoulder seal, and
the first and second shoulder seals each have one end of the horizontal portion of the respective T-shape fixed to the corner portion of each respective aft frame of the aft frames adjacent to each other through the fixing portion formed integrally with the block, and the straight portion of the respective T-shape of the block fixed directly to the corner portion of each respective aft frame of the aft frames adjacent to each other.

5. The gas turbine combustor according to claim 4, wherein the corner portion of each respective aft frame of the aft frames adjacent to each other is provided with a notch, and the respective shoulder seal of the first and second shoulder seals is fixed to the notch.

6. The gas turbine combustor according to claim 5, wherein the notch is formed in an L-shape, and the respective shoulder seal is welded and fixed to the L-shaped notch.

7. The gas turbine combustor according to claim 1, wherein the side seal is disposed along the planar portion of the block of the first shoulder seal in the corner portion of the respective aft frame.

8. The gas turbine combustor according to claim 4, wherein each of the at least two shoulder seals placed opposite to each other in the circumferential direction of the corner portion of each of the aft frames adjacent to each other is provided with a convex portion which is a part of the horizontal portion of the respective T-shape of the block, which protrudes toward an adjacent aft frame side, and the respective convex portions are offset in the radial direction of the respective aft frames to provide a stepped portion.

9. The gas turbine combustor according to claim 8, wherein a leading end of the convex portion provided on each of the at least two shoulder seals forming the stepped portion is disposed with a predetermined gap from the at least two shoulder seals placed opposite to each other in the circumferential direction of the corner portion of each of the aft frames adjacent to each other.

10. The gas turbine combustor according to claim 9, wherein the respective convex portions provided in the respective shoulder seals placed opposite to each other in the circumferential direction of the corner portion of each of the aft frames adjacent to each other overlap with each other in the circumferential direction of the aft frames.

11. The gas turbine combustor according to claim 10, wherein a radial position of the stepped portion provided in the respective shoulder seals of the corner portion of the outer periphery of each of the aft frames adjacent to each other is located on an outer circumferential side of an innermost periphery of a first floating seal of the at least one floating seal which is located at the outer periphery of each of the aft frames adjacent to each other, and a radial position of the stepped portion provided in the respective shoulder seals of the corner portion of the inner periphery of each of the aft frames adjacent to each other is located inside an outermost periphery of a second floating seal of the at least one floating seal which is located at the inner periphery of each of the aft frames adjacent to each other.

12. The gas turbine combustor according to claim 11, wherein in each respective shoulder seal, two flat portions of the block are placed opposite to each other in a flow direction of the combustion gas across the side seal.

13. A transition duct assembly of a gas turbine combustor, comprising:
- a transition duct through which high-temperature combustion gas flows;
- an aft frame placed on a downstream side of the transition duct and to be connected to an upstream side of a gas turbine;
- at least one floating seal that seals a first gap between the aft frame and the gas turbine in at least one of inner and outer peripheries of the aft frame;
- a side seal that seals a second gap between the aft frame and another aft frame of another transition duct that are adjacent to each other in a circumferential direction; and
- a corner seal that is placed in a gap portion provided between a corner portion of the aft frame and another corner portion of the another aft frame that are adjacent to each other in the circumferential direction, and is configured to seal air flowing from at least the gap portion into a gas turbine side, and the corner seal is configured to be separately independent of the at least one floating seal and the side seal and the corner seal is fixed to the aft frame by welding;

wherein the corner seal includes at least two shoulder seals, and the at least two shoulder seals are placed opposite to each other in the circumferential direction of the corner portion and the another corner portion and are fixed respectively to the corner portion and the another corner portion by welding, and the side seal, extending radially between the aft frame and the another aft frame across the at least two shoulder seals, is placed between the at least two shoulder seals placed opposite to each other in the circumferential direction of the corner portion and the another corner portion;

wherein a first shoulder seal of the at least two shoulder seals placed opposite to each other in the circumferential direction of the corner portion and the another corner portion includes a block formed in a T-shape by a straight portion extending in a radial direction and a horizontal portion extending from an end of the straight portion in the circumferential direction, and a fixing portion that fixes the block to the corner portion, surfaces of the straight portion and the horizontal portion of the T-shape of the block on the gas turbine side are formed in a planar portion, and the block includes a first block having a first continuous thickness from the planar portion and formed in a curved shape at an outermost circumferential side on an opposite side of the horizontal portion of the T-shape of the block formed in a plane to the gas turbine side, and a second block formed in a square pillar having a second continuous thickness from the planar portion on an opposite side of the straight portion of the T-shape of the block formed in the plane to the gas turbine side.

* * * * *